Nov. 8, 1955
E. A. CARLSON
2,723,082
AUTOMOBILE HEATING SYSTEM
Filed Jan. 15, 1953
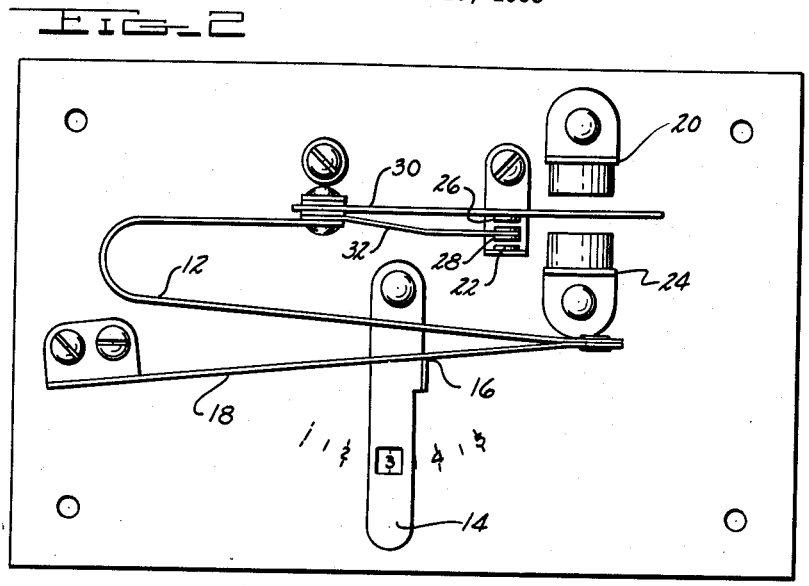
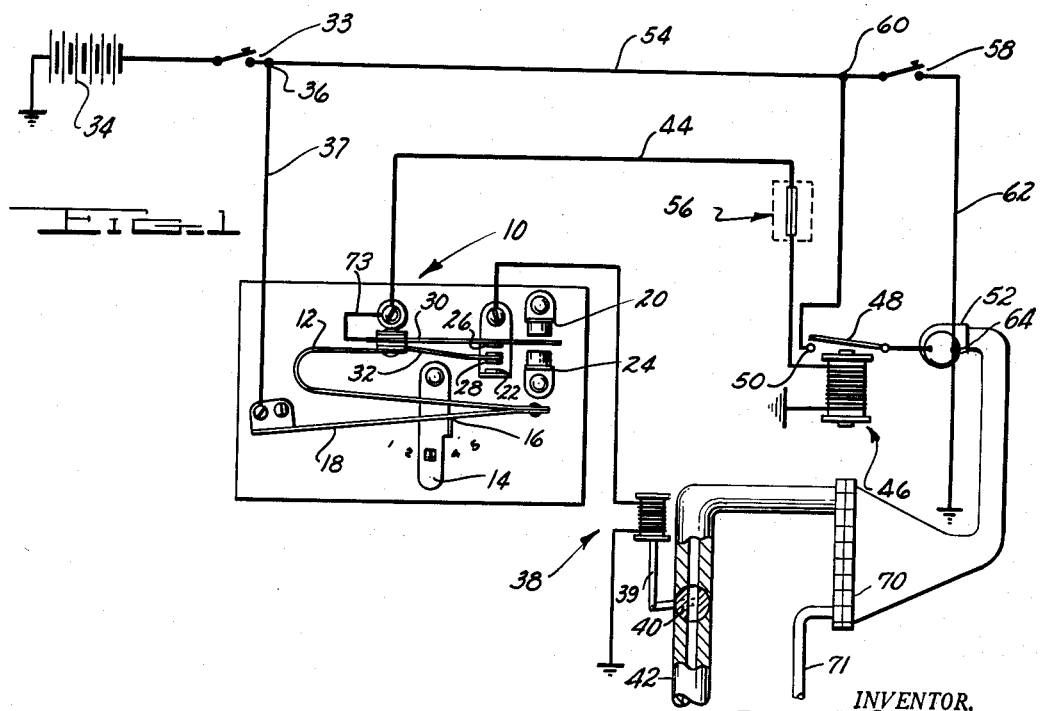
INVENTOR.
ELMER A. CARLSON
BY
Smith and Olsen
ATTORNEYS

United States Patent Office 2,723,082
Patented Nov. 8, 1955

2,723,082

AUTOMOBILE HEATING SYSTEM

Elmer A. Carlson, Detroit, Mich., assignor to Essex Wire Corporation, Detroit, Mich., a corporation of Michigan Application January 15, 1953, Serial No. 331,350

2 Claims. (Cl. 236—38)

This invention relates to a heating system and an automatic heating control, particularly adapted for use with the passenger compartment of a vehicle.

It has been the custom in recent years to equip motor vehicles with fresh air heating systems wherein air intake ducts are provided. These ducts pass outside air to the passenger compartment of the vehicle with an intermediate heat transfer unit provided for warming the air. In this type of heating system, the actual number of B. t. u.'s of heat passing into the passenger compartment is dependent upon the volume and temperature of the air which passes through the heat transfer unit and into the passenger compartment. Inasmuch as the intake ducts generally are ram air scoops, that is, openings in the front of the vehicle, the volume of ram air passed to the compartment is related to the speed of the car. In addition, the volume of air is related to the size of the openings in the ducts, and provision is usually made for manual change by the operator of the size of the air ducts. Further manual control of air volume is provided through the use of intake fans inserted in the intake air stream. These fans can be used to pull air into the car when it is standing still or going at low speeds.

The temperature of the air passed to the compartment by the ram scoops or fans is dependent upon the volume of hot water delivered to the heat transfer unit.

Thus, it will be seen that there are four variables controlling the heat delivered to the passenger compartment: speed of the vehicle, speed of the intake fans, size of the openings of the air scoops, and volume of hot water delivered to the heat transfer unit. In the usual fresh air heat system each of these variables is independently subject to the control of the vehicle operator.

There is a continuous change in passenger compartment temperature due to the variation of these various factors, which requires that the vehicle operator must constantly make compensatory adjustments to try to maintain a given compartment temperature. Inasmuch as the operator has several controls to choose from, he does not usually make the proper adjustment. The presence of so many controls is confusing to the operator, and his effective use of the system is hampered as a result. This is particularly true of women drivers. Most women are not mechanically minded and the necessity for operating various controls is a bewildering and unpleasant experience.

One of the basic features of the present invention is that the operator has but one control and one adjustment, which can be set to a desired temperature setting and which will result in a constant maintenance of this temperature.

It is a principal object of this invention to provide a heating system particularly adapted for use in passenger vehicles, which includes only one thermostatic control that the operator of the vehicle can set to provide a comfortable and substantially constant passenger compartment temperature.

It is a further object of this invention to provide a single thermostatic control for such a system which is actuated by passenger compartment temperature and which relates and governs the variables affecting volume and temperature of heated air entering the passenger compartment.

Other objects of this invention will appear in the following description and appended claims, reference being had to the accompanying drawings forming a part of this specification wherein like reference characters designate corresponding parts in the several views.

In the drawings:

Fig. 1 is a schematic wiring diagram of the heating system of the present invention.

Fig. 2 is a front elevation of the thermostatic control switch of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

For a detailed explanation of a preferred embodiment of the heating control and the heating system of the present invention, reference is made to the schematic diagram shown in Fig. 1 of the drawings. A thermostatic switch 10 is provided comprising a substantially U-shaped bi-metallic blade 12 with the high expansion element on the inner side of said U. Means are provided, as by the lever 14 for making the desired temperature settings. If the lever 14 is moved to the right in Fig. 1, the rider 16 presses against the spring 18 which is affixed to one end of the U-shaped blade 12 and the U-shaped blade 12 moves toward the magnet 20. Conversely movement of lever 14 in the opposite direction causes the bi-metallic blade 12 to move in the direction of the fixed contact 22 and magnet 24.

For a given thermostatic setting selected by the operator for passenger compartment comfort, if the passenger compartment is at, or above, the selected temperature, the contacts 26 and 28 will be open as indicated in Fig. 1. If the temperature of the compartment drops, the bi-metallic blade 12 contracts and the arm 30 tends to move out of the magnetic field of magnet 20 in the direction of magnet 24. The addition of the magnetic force of magnet 24 to the contractive forces urging arm 30 away from magnet 20 results in a sudden closing of the contacts 22 and 28 when the critical temperature is reached. Conversely, when the contacts 22 and 28 are opened, a sharp break of the contacts is achieved by the use of such a magnet arrangement. Upon the closing of contacts 22 and 28, further movement of arm 30 toward magnet 24, is resisted by the force required to overcome the resistance offered by arm 32. With the ignition switch 33 closed and contacts 22 and 28 closed, current flows from the power source 34, through the ignition switch 33, the terminal 36, the wire 37, the spring 18, the bi-metallic blade 12, contacts 28 and 22 and coil 38. The coil 38 is disposed in a standard manner to move a core 39 and a valve 40 to a position for allowing hot water to flow through the pipe 42 to a heat transfer unit as indicated. If sufficient air is passing through the heat transfer unit, the passenger compartment may be heated to the desired temperature by the increased temperature of air due to the increased flow of hot water. If the car is standing still or moving slowly, the volume of air entering the compartment may be insufficient to heat the compartment. In this event, a blower circuit is actuated to provide additional air volume. The actuation will result by the continued contracting of the bi-metallic blade 12 due to the continued lowering of the passenger compartment temperature, which contraction finally overcomes the resistance of the arm 32 and closes the contacts 26 and 28. When the contraction proceeds to the point where the resistance of arm 32 is overcome, a snap contact of contacts 26 and 28 results, due to the strong magnetic attraction of the magnet 24. With the contacts 22, 26 and 28 closed, current flows to the contact 28 as previously described, and a circuit is completed through contact 26, armature 30, lead 73, lead 44, and the coil of the relay 46 to ground. The relay 46 pulls in the armature 48 and engages armature 48 with contact 50, allowing current to flow to the blower motor 52, from the power source 34 through lead 54. The blower fans increase the volume of air passing into the heater and into the compartment. As the temperature of the compartment increases, the contacts will be opened in the reverse order.

An immersion thermostat, rated at approximately 100° F., is provided at 56, to avoid air being blown into the car through a cold heat transfer unit. When the temperature of the water being supplied to the heat transfer unit reaches 100° F., the thermostat 56 closes and allows the blower fans 52 to operate.

An over-ride circuit may be provided for windshield defroster ducts through the use of a switch 58, so that the blower 52 can be used when the heater is inoperative. The switch is used to close the circuit through the lead 54, terminal 60, lead 62, and terminal 64 to the blower 52. Thus the main blower motor 52 can be used for defrosting purposes when the heater circuit is inoperative due to the thermostatic control 56. It is also possible to provide additional blowers for the defroster circuit and separate heating units as desired.

It should be understood that my invention is capable of various modifications within the scope of the appended claims.

Having thus described my invention, I claim:

1. In a fresh air heating system having a heat exchanger and a blower in communication with said heat exchanger and the space to be heated, a thermostat control comprising a substantially U-shaped bi-metallic blade having two spaced legs joined at one end, two arms depending from one leg thereof in substantially parallel relation, a pair of adjacent contacts one on each of said arms, and a fixed contact adjacent one of said arms, the contact on one arm and the fixed contact being engaged upon contraction of said bi-metallic blade to actuate the heat exchanger, and upon further contraction of said blade the contact on the other arm being engaged with the contact on the first mentioned arm to actuate the blower, the contacts being opened in reverse sequence as the bi-metallic blade is expanded in response to an increase in temperature in the space being heated, and means to adjust the bi-metallic blade to different temperatures.

2. The combination as claimed in claim 1 wherein the second mentioned arm extends between two spaced magnets so that as the arm enters the field of one magnet the contacts are opened or closed with a positive snap action.

References Cited in the file of this patent

UNITED STATES PATENTS

| | | |
|---|---|---|
| 1,665,801 | Sweatt | Apr. 10, 1928 |
| 1,909,870 | Rosino | May 16, 1933 |
| 2,019,991 | Nilson | Nov. 5, 1935 |
| 2,240,003 | McGrath | Apr. 29, 1941 |
| 2,312,353 | Miller | Mar. 2, 1943 |
| 2,381,557 | Ray | Aug. 7, 1945 |
| 2,496,135 | Sedwitz | Jan. 31, 1950 |
| 2,533,274 | Matulaitis et al. | Dec. 12, 1950 |
| 2,562,685 | Adams | July 31, 1951 |